United States Patent [19]

Baba

[11] Patent Number: 4,562,528
[45] Date of Patent: Dec. 31, 1985

[54] BACKUP CONTROL APPARATUS
[75] Inventor: Akinori Baba, Kobe, Japan
[73] Assignee: Mitsubishi Denki Kabushiki Kaisha, Tokyo, Japan
[21] Appl. No.: 433,152
[22] Filed: Oct. 6, 1982
[51] Int. Cl.$^4$ .............................................. G06F 15/46
[52] U.S. Cl. .................................... 364/133; 364/187; 371/9
[58] Field of Search ............... 364/131, 132, 133, 187; 371/9

[56] References Cited

U.S. PATENT DOCUMENTS

| 3,636,331 | 1/1972 | Amrehm | 364/133 X |
| 3,978,659 | 9/1976 | Smith et al. | 364/187 X |
| 4,029,952 | 6/1977 | Giras et al. | 364/133 X |
| 4,351,023 | 9/1982 | Richer | 364/133 X |

Primary Examiner—Jerry Smith
Assistant Examiner—Allen MacDonald
Attorney, Agent, or Firm—Lowe, King, Price & Becker

[57] ABSTRACT

A backup control apparatus comprises a main control system (1) and a backup control system (2), coupled in parallel, and correcting circuits (61 to 64). If and when the main control system is in an abnormal state, the abnormal state of the main control system is determined by a switch control portion (3). A drive portion (5) coupled to the output of the main control system is switched by a switch portion (4) in response to the determined output to be coupled to the output of the backup control system. A tracking signal obtained from proportional integrating elements (17, 19) included in the main control system abruptly fluctuates as a function of the abnormal state of the main control system. The fluctuation of the tracking signal is mitigated by the correcting circuit including a dead time component or a first order lag component, whereupon the same is applied to proportional integrating elements (27, 29) included in the backup control system. The drive portion is controlled in response to the control signal based on the tracking signal after correction during a period of time when the switch portion is switched from the main control system to the backup control system.

4 Claims, 18 Drawing Figures

←—DEAD TIME—→

BACKUP CONTROL APPARATUS

BACKGROUND OF THE INVENTION

1. Field of the Invention

The present invention relates to a backup control apparatus. More specifically, the present invention relates to an improvement in a backup control apparatus employed in such as an environment wherein a backup control system is provided in parallel with a main control system for adjusting the water level of a steam generator in a nuclear power plant and the steam generator is controlled by the backup control system by switching the system to the backup control system when the main control system operates in an abnormal state.

2. Description of the Prior Art

It has been a conventional approach that a backup control system is provided in parallel with a main control system for the purpose of enhancing the safety in such an environment as a power plant. In such a case, in switching the system to the backup control system upon occurrence of an abnormal state in the main control system, it is necessary to smoothly switch the line without interruption of a control operation. To that end, it is normally necessary to track the backup control system with respect to the main control system.

Figure 1:
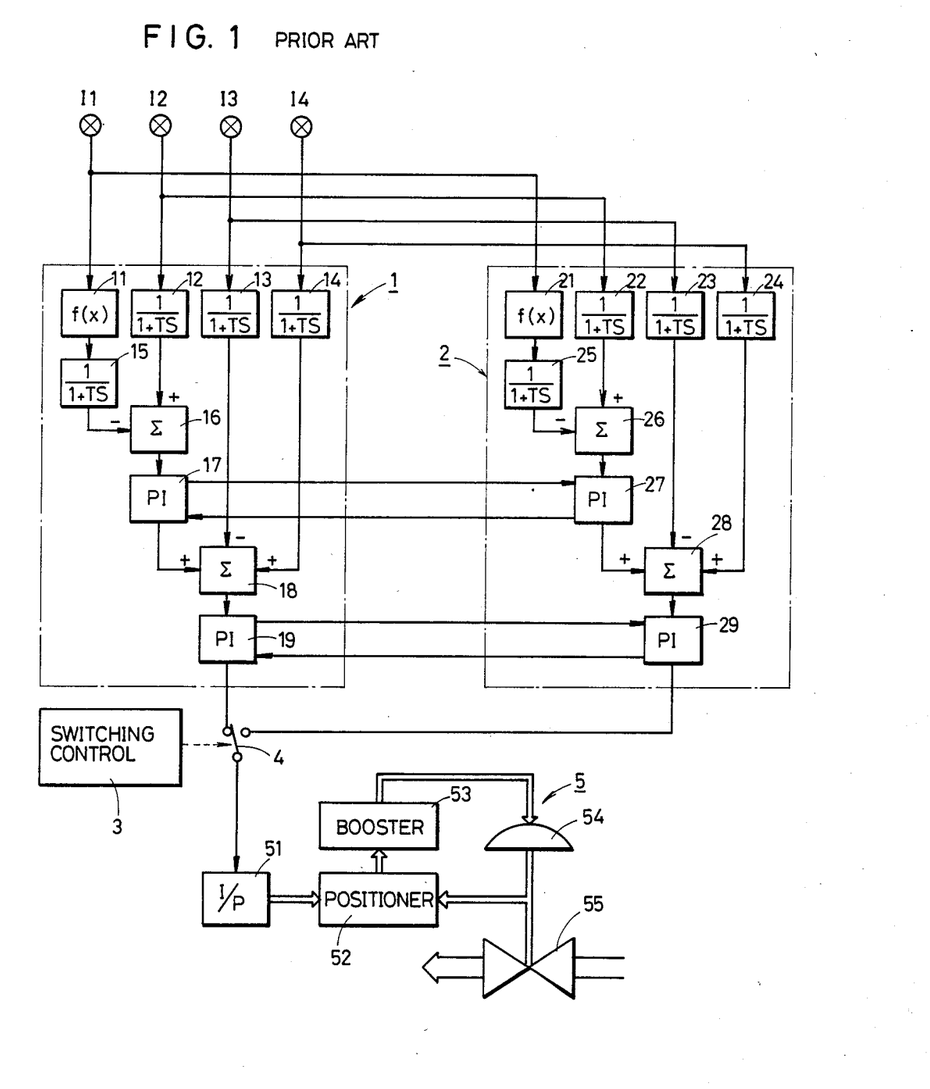
FIG. 1 is a block diagram showing one example of a conventional backup control apparatus.
Figure 2:
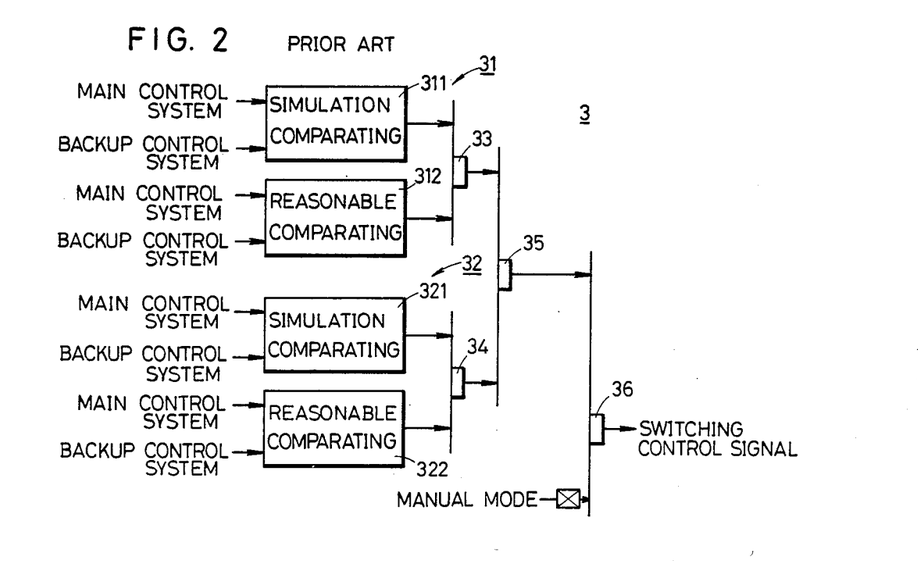
FIG. 2 is a block diagram of a switch control portion shown in FIG. 1.

FIG. 1 is a block diagram showing one example of a conventional backup control apparatus and FIG. 2 is a block diagram of a switch control portion shown in FIG. 1. The backup control system shown in FIGS. 1 and 2 is an example of adjusting the water level of a steam generator for use in a nuclear power plant. First referring to FIGS. 1 and 2, the structure of a conventional backup control apparatus will be described. For the purpose of adjusting the water level of the steam generator, not shown, the first stage pressure of a steam turbine, not shown, the current water level in the steam generator, the flow rate of water being supplied to the steam generator, and the flow rate of the steam generated by the steam generator are required as parameters. The input signals I1 to I4 representing these parameters are applied in parallel to the main control system 1 and the backup control system 2. The main control system 1 and the backup control system 2 are implemented in substantially the same structure. The main control system 1 comprises a function generator 11, first order lag elements 12, 13, 14, and 15, adder/subtractors 16 and 18, and proportional integrating elements 17 and 19. The function generator 11 is supplied with an input signal I1 representing the pressure value of the steam turbine. The function generator 11 is responsive to the function f(x) to convert the pressure value in proportional to flow rate into a reference water level. More specifically, the function generator 11 evaluates the reference water level based on the pressure value. The reference water level evaluated by the function generator 11 is subjected to mitigation by a first order lag amount $1/(1+TS)$ by means of a first order lag element 15 for the purpose of avoiding an abrupt change, whereupon the output thereof is applied to an adder/subtractor 16. The input signal I2 representing the value of the water level of the steam generator is applied through the first order lag element 12 to the adder/subtractor 16. Accordingly, the adder/subtractor 16 makes addition/subtraction of the reference water level based on the pressure value and the water level of the steam generator, whereby the output is applied to the proportional integrating element 17. The output from the proportional integrating element 17 is applied to the adder/subtractor 18. The input signal I3 representing a water supply amount is applied to the adder/subtractor 18 through the first order lag element 13 and the input signal I4 representing the flow out amount of the steam from the steam generator is applied through the first order lag element 14 to the adder/subtractor 18. The output of the adder/subtractor 18 is applied to one contact of the switch portion 4 through the proportional integrating element 19.

The backup control system 2 is similar to the main control system 1 and comprises a function generator 21, first order lag elements 22, 23, 24 and 25, adder/subtractors 26 and 28, and proportional integrating elements 27 and 29. The output signal of the backup control system 2 is applied to the other contact of the switch portion 4. Meanwhile, the proportional integrated output signals obtained from the proportional integrating elements 17 and 19 included in the main control system 1 are applied to the proportional integrating elements 27 and 29, respectively, included in the backup control system 2 as a tracking signal. Likewise, the proportional integrated output signals obtained from the proportional integrating elements 27 and 29 of the backup control system 2 are applied to the proportional integrating elements 17 and 19, respectively, of the main control system 1 as a tracking signal.

If and when either of the main control system 1 and the backup control system 2 operates in an abnormal state, the abnormal state is determined by the switch control portion 3 and the switch portion 4 is turned to the output side of the control system in a normal state. The control output signal as switched by the switch portion 4 is applied to the drive portion 5. The drive portion 5 comprises a current/air pressure converter 51, a positioner 52, a booster 53, a diaphragm 54, and a valve 55. The current/air pressure converter 51 serves to convert the control signal obtained from the main control system 1 or the backup control system 2 through the switch portion 4 into an air pressure. The air pressure converted by the current/air pressure converter 51 is applied to the positioner 52. The positioner 52 detects an opened/closed position of the valve 55, thereby to compare the detected opened/closed position with the air pressure obtained from the current/air pressure converter 51. The positioner 52 provides a control signal to the booster 53 for the opened/closed position of the valve 55 consistent with the air pressure obtained from the current/air pressure converter 51. The booster 53 amplifies the control signal applied to the diaphragm 54, thereby to make the opened/closed position of the valve 55 correspond to the air pressure obtained from the current/pressure converter 51. The switch control portion 3 shown in FIG. 1 comprises a control system abnormality determining portion 31 for determining an abnormal state of the main control system 1 and the backup control system 2, and a drive portion abnormality determining portion 32 for determining an abnormal state of the drive portion 5. The control system abnormality determining portion 31 comprises a simulation comparing portion 311 and a reasonable comparing portion 312. The simulation comparing portion 311 serves to compare the output signal from the function generator 11 of the main control system 1 and the output signal from the function generator 21 of the backup control signal 1, for example, thereby to determine whether the respective outputs are consistent with each other. Meanwhile, the simulation comparing portion 311 further comprises a function for determining whether the output of the first order lag elements 12 to 14, the proportional integrating elements 17 and 19 of the main control system 1 are consistent with the respective outputs from the first order lag elements 22 to 24, the proportional integrating elements 17 and 19 of the backup control system 2. The reasonable comparing portion 312 serves to determine, for example, whether the rate of change of the output value of the turbine applied to the function generator 11 is substantially larger than a predetermined value. The outputs from the simulation comparing portion 311 and the reasonable comparing portion 312 are applied through an AND circuit 33 to one input of an AND circuit 35.

The drive portion abnormality determining portion 32 is similar to the control system abnormality determining portion 31 and comprises a simulation comparing portion 321 and a reasonable comparing portion 322. However, the drive portion 5 comprises only one system and therefore an imitation means, not shown, structured to be imitated to the drive portion 5 is provided, so that the simulation comparing portion 321 may determine whether the drive portion 5 is in an abnormal state as compared with the imitation means. The reasonable comparing portion 322 determines whether the rate of change of the air pressure obtained from the current/air pressure converter 51, for example, included in the drive portion 5 is substantially larger than a predetermined value. The respective output signals from the simulation comparing portion 321 and the reasonable comparing portion 322 are applied through an AND circuit 34 to the other input of the above described AND circuit 35. The output of the AND gate 35 is applied through an AND circuit 36 to the switch portion 4. Accordingly, the switch portion 4 is turned when the control system abnormality determining portion 31 and the drive portion abnormality determining portion 32 included in the switch control portion 3 determine that either the main control system 1 or the backup control system 2 is in an abnormal state. Meanwhile, the switch portion 4 may be structured to be unswitchable in a manual mode.

Figure 3A:
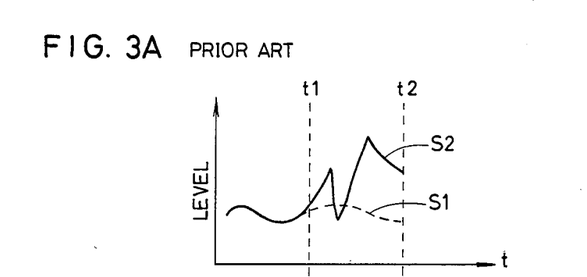
FIGS. 3A and 3B are graphs showing waveforms of a tracking signal in FIG. 1.

FIGS. 3A and 3B are graphs showing waveforms of the tracking signal shown in FIG. 1. Now referring to FIGS. 3A and 3B, an operation of the FIG. 1 diagram will be described. Let it be assumed, for example, that the switch portion 4 is turned to the output side of the main control system 1 and the drive portion 5 is controlled in response to the control output signal of the main control system 1. Then the tracking signals are individually supplied from the proportional integrating elements 17 and 19 of the main control system 1 to the proportional integrating elements 27 and 29, respectively, of the backup control system 2 and the tracking signals are supplied from the proportional integrating elements 27 and 29 of the backup control system 2 to the proportional integrating elements 17 and 19, respectively, of the main control system 1. It is further assumed that at the timing t1 shown in FIG. 3A the output of the function generator 11 of the main control system 1 abruptly fluctuates as compared with the output of the function generator 21 of the backup control system 2, for example, whereby the curve to be assumed inherently as shown as the curve S1 in FIG. 3A has become as shown as the solid line S2. This abnormal state is determined by the simulation comparing portion 311 of the switch control portion 3. Accordingly, the switch portion 4 is responsive to the switch control signal obtained from the switch control portion 3 to be turned to the output side of backup control system 2 at the time t2. Since the backup control system 2 is tracking the main control system 1 at that time during a time period of the switch timing t1 to t2, the same provides a control signal which is consistent with the control signal of the main control system 1. Since the conventional backup control apparatus is adapted mutually to track simultaneously between the main control system 1 and the backup control system 2 without any time delay, the conventional apparatus has a feature that a continuous control signal can be applied to the drive portion 5 even if the switch portion 4 is turned to either the output side of the main control system 1 or the output side of the backup control system 2.

Figure 3B:
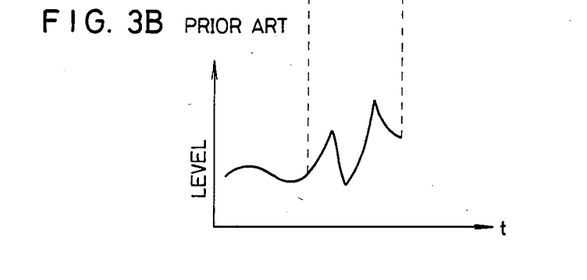

However, until before the switch control portion 3 determines that an abnormality took place in the main control system 1, for example, and the switch portion 4 is turned to the output side of the backup control system 2, i.e. during a time period of the timing t1 to t2, a tracking signal abruptly fluctuating as shown in FIG. 3B is supplied from the main control system 1 to the backup control system 2. Therefore, the backup control system 2 follows such abnormal tracking signal. As a result, a disturbance that is more than necessary is caused in the backup control system 2 and the drive portion 5 impacts upon an apparatus being controlled, with the result that a stable control cannot be performed.

SUMMARY OF THE INVENTION

Accordingly, a principal object of the present invention is to provide a backup control system which is capable of preventing occurrence of disturbance through mitigation of abrupt fluctuations in a tracking signal that tend to occur when either a main control system or a backup control system is in an abnormal state.

In brief, the present invention comprises a backup control apparatus wherein a switch portion is turned to one of a main control system and a backup control system when the other of the main control system and the backup control system operates in an abnormal state wherein abrupt fluctuations in the tracking signal are mitigated and the tracking signal thus corrected is applied to the control system to which the switch portion is turned.

According to the present invention, an abrupt fluctuation in a tracking signal obtained from the control system in an abnormal state is corrected and the tracking signal thus corrected is applied to the control system in a normal state. As a result, switching from the control system in an abnormal state to the control system in a normal state can be smoothly made and a machine to be controlled which is to be driven by the control system is prevented from being impacted upon due to such abrupt fluctuation.

In a preferred embodiment of the present invention, a tracking signal with such an abrupt fluctuation obtained from the control system in an abnormal state is corrected by means of a dead time component or a first order lag component, whereby the abrupt fluctuation is mitigated.

Therefore, according to the embodiment of the present invention, by simply adding a dead time component or a first order lag component in the path of a tracking signal between the main control system the and the backup control system, occurrence of an unnecessary disturbance can be prevented, and switching from a control system in an abnormal state to a control system in a normal state can be smoothly made, whereby impact upon a machine to be controlled can be decreased.

These objects and other objects, features, aspects and advantages of the present invention will become more apparent from the following detailed description of the present invention when taken in conjunction with the acompanying drawings.

DESCRIPTION OF THE PREFERRED EMBODIMENTS

Figure 4A:
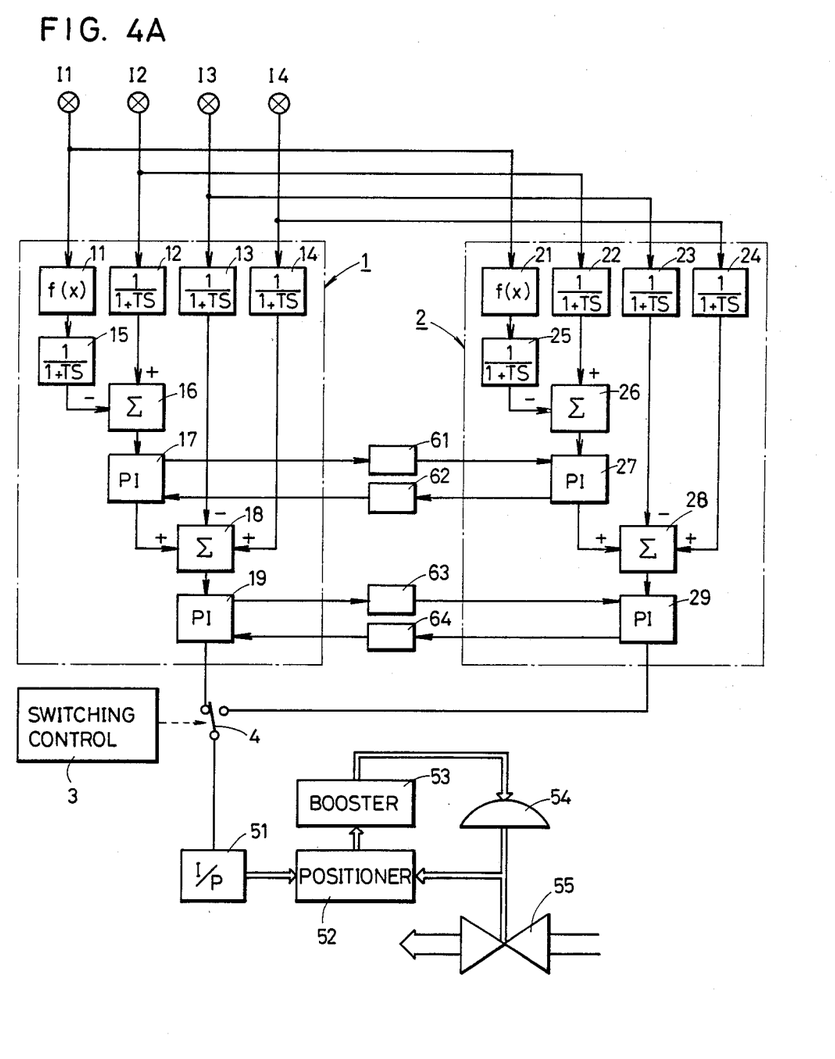
FIG. 4A is a block diagram of one embodiment of the present invention.

FIG. 4A is a block diagram of one embodiment of the present invention. The FIG. 4A embodiment is substantially the same as the FIG. 1 circuit configuration, except for provision of correcting circuits 61 to 64 in a tracking path between the main control system 1 and the backup control system 2. The correcting circuits 61 to 64 are adapted to correct a tracking signal with an abrupt fluctuation to a tracking signal having an easy change, thereby to prevent the occurrence of an unnecessary disturbance. The correcting circuit 61 corrects a tracking signal from a proportional integrating element 17 of the main control system 1 to provide the corrected signal to the proportional integrating element 27 of the backup control system 2. The tracking signal obtained from the proportional integrating element 27 is applied to the proportional integrating element 17 of the main control system 1 by means of the correcting circuit 62. The tracking signal obtained from the proportional integrating element 19 of the main control system 1 is applied through the correcting circuit 63 to the proportional integrating element 29 of the backup control system 2. The tracking signal obtained from the proportional integrating element 29 is applied through the correcting circuit 64 to the proportional integrating element 19 of the main control system 1.

Figure 5:
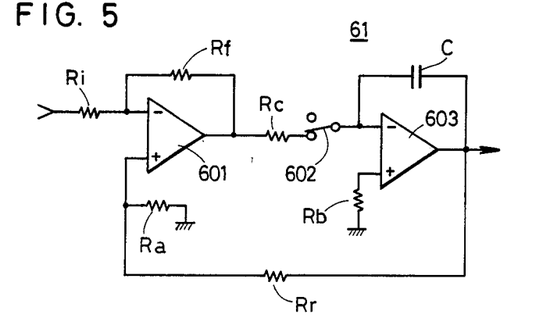
FIG. 5 is a schematic diagram showing an example of a correcting circuit shown in FIG. 4 implemented with a dead time component.

FIG. 5 is a schematic diagram showing an example of the correcting circuit implemented with a dead time component. First referring to FIG. 5, a structure of the correcting circuit 61 will be described. The tracking signal obtained from the integrating element 17 included in the main control system 1 is applied through an input resistor Ri to one input of a first stage operational amplifier 601. The other input of the operational amplifier 601 is connected through a resister Ra to the ground and is also connected through a feedback resister Rr to the output of a subsequent stage operational amplifer 603. The output of the operational amplifier 601 is connected through a feed back resister Rf to one input of the operational amplifier 601 and is also connected through a resister Rc to one side contact of a switch 602. A common contact of the switch 602 is connected to one input of the operational amplifier 603 and is also connected through a capacitor C to the output of the operational amplifier 603. The other input of the operational amplifier 603 is connected through a resister Rb to the ground. Meanwhile the correcting circuits 62 to 64 shown in FIG. 4 are structured in substantially the same manner as that of the correcting circuit 61.

Figure 6:
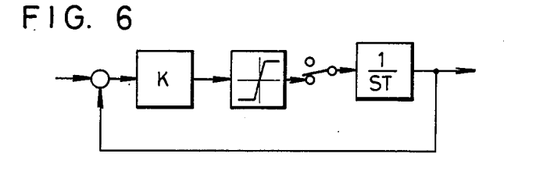
FIG. 6 is a block diagram of a correcting circuit shown in FIG. 5.
Figure 7:
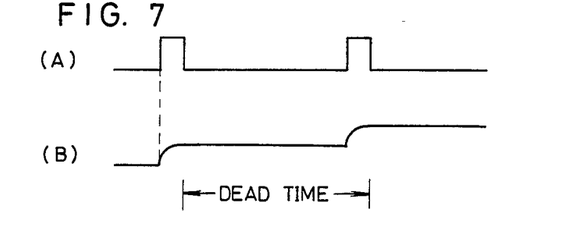
FIG. 7 is a graph showing waveforms for explaining the operation of the FIG. 5 diagram.
Figure 8:
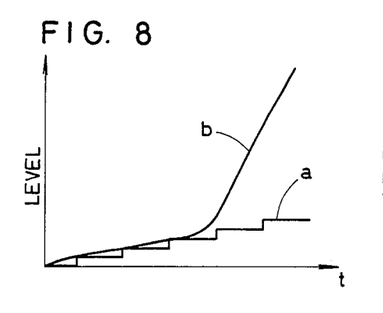
FIG. 8 is a graph showing changes of a tracking signal and a signal as corrected by the dead time component.
Figure 9:
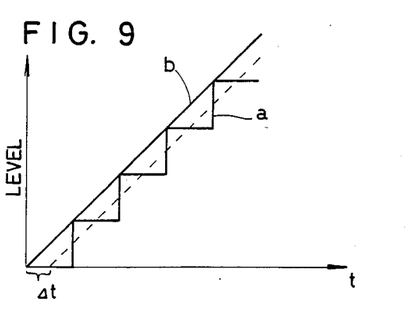
FIG. 9 is a graph showing the changes, in an enlarged scale, of the tracking signal and the signal as corrected.
Figure 10A:
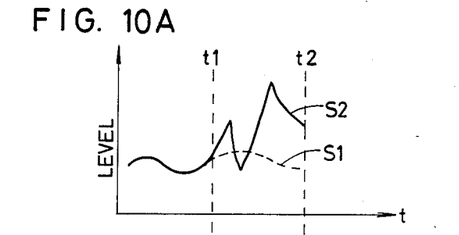
FIGS. 10A to 10D are graphs of the waveforms of a control signal, a tracking signal, and a signal obtained by correcting the tracking signal.
Figure 10B:
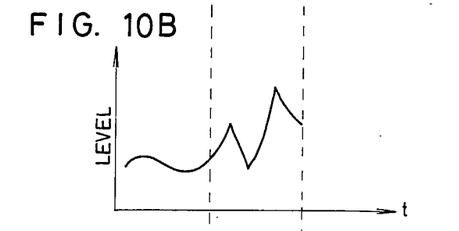
Figure 10C:
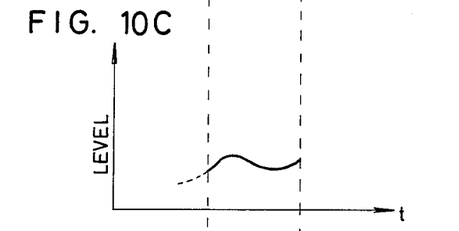

FIG. 6 is a block diagram of the FIG. 5 correcting circuit 61, FIG. 7 is a graph showing waveforms for explaining an operation of the FIG. 5 diagram, FIG. 8 is a graph showing changes of the tracking signal and the signal obtained by correcting the same with the dead time component, FIG. 9 is a graph showing the changes, in an enlarged manner, of the tracking signal and the signal obtained by correcting the same with the dead time component, and FIGS. 10A to 10C are graphs of the wave forms for explaining the operation of the FIG. 4A embodiment.

Now the operation of the embodiment of the present invention will be described in the following. The block diagram of the FIG. 5 correcting circuit 61 on the occasion of tracking can be shown as seen in FIG. 6. More specifically, the proportional sensitivity K of the dead time component may be expressed as a ratio of the input resister Ri and the feedback resistor Rf, as follows.

K=Rf/Ri

The integrating component is also expressed as 1/ST, where T=CRc. The transfer function G(S) on the occasion of non-saturation is expressed as follows.

$$G(S) = \frac{1}{1 + \frac{T}{K} \cdot S}$$

Now an operation of the FIG. 5 correcting circuit 61 will be described in the following. The switch 602 is adapted to be closed each time the pulse signal shown as (A) in FIG. 7 is applied from a pulse generator, not shown. When the switch 602 is closed, the capacitor C is charged with the tracking signal applied to the operational amplifier 601. Since the other input of the operational amplifier 601 has been supplied with the output signal of the subsequent stage operational amplifier 603, the level of the output signal of the operational amplifier 603 is restricted due to saturation of the operational amplifier 601, even if the abruptly fluctuating tracking signal is applied to one input of the operational amplifier 601. Therefore, it follows that, as shown as (B) in FIG. 7, the tracking signal, as corrected, obtained from the operational amplifier 603 has a limited level. The switch 602 is closed again by the next pulse signal, the capacitor C is charged with the tracking signal having the level higher than the output level of the operational amplifier 603. Accordingly, as shown in FIG. 8, even if the tracking signal abruptly fluctuates, it follows that the output signal from the correcting circuit 61 changes stepwise and in an easy fashion as compared with the obtained tracking signal. A comparison of the tracking signal applied to the correcting circuit 61 and the tracking signal, as corrected, is shown in an enlarged manner in FIG. 9, wherein the applied tracking signal increases approximately linearly, while the tracking signal, as corrected, with the dead time component increases stepwise, which means that when the tracking signal, as corrected, is considered in terms of an average value, the tracking signal, as corrected, involves a delay by a dead time of $\Delta t$, as compared with the applied tracking signal.

Accordingly, in the case where an abnormality takes place in the main control system 1 shown in FIG. 4 at the timing t1 in FIG. 10A and the control signal which is supposed to be inherently the curve S1 shown by the dotted line abruptly fluctuates as shown by the curve S2, the tracking signal also abruptly fluctuates as shown in FIG. 10B; however, a tracking signal before the abnormality arises is provided with a delay of a dead time as shown in FIG. 10C by means of the correcting circuit 61. Thus, the tracking signal with an abrupt fluctuation obtained from the integrating component 17 of the main control system 1 is corrected by the correcting circuit 61 with a delay of a dead time and the tracking signal, as corrected, is applied to the proportional integrating element 27 of the backup control system 2. Thus, it follows that during a time period of the timing t1 to t2, the backup control system 2 tracks the control signal as it was before occurrence of the abnormality, i.e., as a function of the tracking signal, as corrected by the correcting circuit 61, i.e. the tracking signal as it was earlier by the time delay of dead time established by the correcting circuit 61.

Such state is kept until the timing t2 when the switching is completed and after the timing t2 the backup control system 2 controls the drive portion 5 as a function of the input signals I1 to I4. Accordingly, in the case where the tracking signal obtained from the main control system 1 abruptly fluctuates based on the abnormal state of the main control system 1, the backup control system 2 can continually control the drive portion 5 as a function of the input signals I1 to I4 without being influenced by the abnormal state. In the case where an abnormal state occurs in the backup control system 2 this time while the drive portion 5 is thus being controlled by the backup control system 2, then the switch portion 4 is turned to the main control system 1 and the tracking signal obtained from the proportional integrating element 27 included in the backup control system 2 is corrected by the correcting circuit 62 and is applied to the main control system 1. Accordingly, the control of the drive portion 5 is smoothly switched from the backup control system 2 to the main control system 1.

Meanwhile, it follows that neither the main control system 1 nor the backup control system 2 is responsive to the input signals I1 to I4 coming during a time period when the switch portion 4 is making a switching operation during the time period of the timing t1 to t2. However, by selecting the time period between the timing t1 to t4 to be not so large, the switching can be performed without causing disturbance of control in the whole control system.

Figure 11:
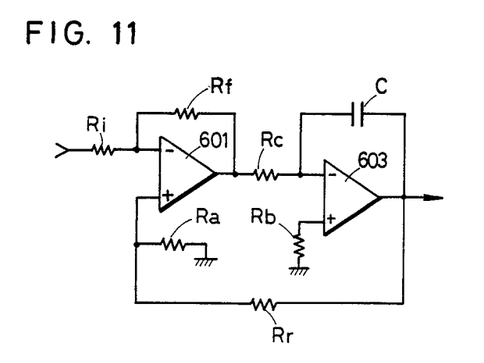
FIG. 11 is a schematic diagram showing one embodiment of a correcting circuit shown in FIG. 4 implemented with a first order lag component.
Figure 12:
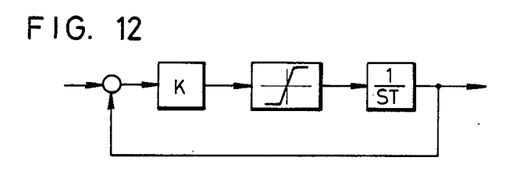
FIG. 12 is a block diagram of the correcting circuit shown in FIG. 11.

FIG. 11 is a schematic diagram of another example of the FIG. 4A correcting circuit. The correcting circuit 61 shown in FIG. 11 is implemented with a first order lag component. More specifically, as compared with the FIG. 5 diagram, the FIG. 11 correcting circuit is structured such that the switch 602 in FIG. 5 is dispensed with and the output of the operational amplifier 601 is connected through the resister Rc to one input of the operational amplifier 603. The FIG. 11 correcting circuit can be shown by as shown in FIG. 12.

Figure 10D:
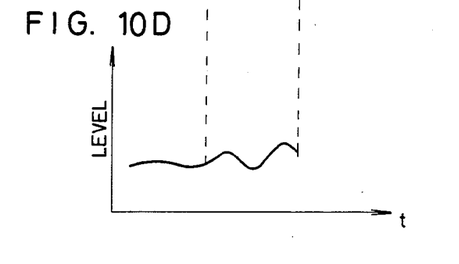
Figure 13:
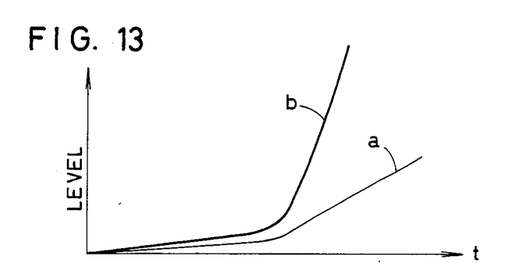
FIG. 13 is a graph showing changes of a tracking signal and a signal obtained by correcting the same with a first order lag component.

FIG. 13 is a graph showing waveforms for explaining the operation of the FIG. 11 diagram. Now the operation of the FIG. 11 correcting circuit will be described in the following. If and when the main control system 1 shown in FIG. 4A becomes in an abnormal state and an abruptly increasing tracking signal is applied to the input of the operational amplifier 601, the capacitor C is charged with the tracking signal and the output level of the operational amplifier 603 becomes high in accordance with the charge voltage. Since the output of the operational amplifier 603 is fed back to the other input of the operational amplifier 601, the operational amplifier 601 charges the capacitor C when the tracking signal of the level higher than the output of the operational amplifier 603 is applied. However, since the operational amplifier 601 becomes saturated when too large a tracking signal is applied, the level of the signal obtained from the operational amplifier 603 is limited. Accordingly, even if the main control system 1 becomes in an abnormal state at the timing T1, as shown in FIG. 13, the tracking signal, as corrected with the correcting circuit, is corrected to be gradually increasing in terms of the level. Similarly, even if the tracking signal abruptly decreases, the tracking signal, as corrected, gradually decreases. Accordingly, as shown in FIG. 10B, even if the tracking signal obtained from the main control system 1 abruptly fluctuates, a mitigated or easy changing waveform as shown in FIG. 10D, is obtained by correcting the tracking signal with the first order lag component. Thus, by correcting the tracking signal with an abrupt fluctuation by means of the correcting circuit implemented with the first order lag component as shown in FIG. 11, disturbance of control can be mitigated.

Figure 14:
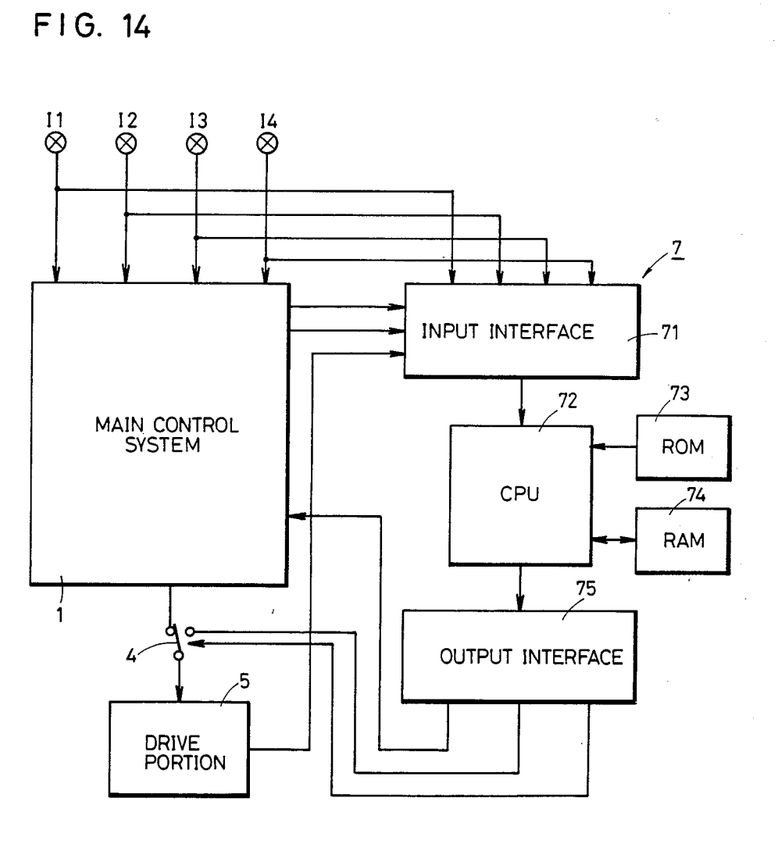
FIG. 14 is a block diagram showing another embodiment of the present invention.

FIG. 14 is a block diagram showing another embodiment of the present invention. In the FIG. 14 embodiment, the backup control system 2 shown in FIG. 4A is implemented using a microcomputer 7, which is structured to perform correction of the tracking signal as well as in a software manner. The microcomputer 7 comprises an input interface 71, a central processing unit 72, a read only memory 73, a random access memory 74, and an output interface 75. The input interface 71 is connected to receive the input signals I1 to I4 and the tracking signal obtained from the main control system 1. In order to achieve a simulation comparison check and a reasonable comparison check, which were previously described with reference to FIG. 1, by means of the microcomputer 7, the output signals from the function generator 1 of the main control system 1 and the first order lag components 12 to 14 are supplied to the input/output interface 71. In order to further perform the simulation comparison check and the reasonable comparison check of the drive portion 5, the signal representing the air pressure of the output of the current/air pressure converter 51, for example, of the drive portion 5 is applied to the input interface 71.

The central processing unit 72 is responsive to the program stored in the read only memory 73 to perform a backup control to the main control system and at the same time to perform correction of the tracking signal. Alternatively, a random access memory is substituted for the read only memory 73 for the purpose of storing the program in the random access memory. The random access memory 74 is used for storing data obtained by evaluation by the central processing unit 72, and for storing pseudo data for performing simulation comparison check and reasonable comparison check of the drive portion 5. The output interface 75 provides to the main control system 1 the tracking signal as corrected of the backup control system obtained from the central processing unit 72. The output interface 75 also provides the backup control signal to the other contact of the switch portion 4 and also provides the switch control signal to the switch portion 4.

Now referring to FIG. 14, the operation of the above described other embodiment of the present invention will be described. The central processing unit 72 processes the input signals I1 to I4 supplied to the input interface 71, thereby to provide the backup control signal. More specifically, the respective processing performed by the function generator 21, the first order lag components 22 to 25, the adder/subtractors 26 and 28, and the proportional integrating elements 27 and 29 shown in FIG. 4A are performed in accordance with the program. Such program processing is well known by those skilled in the art. Therefore, more detailed description of such program processing will be omitted. The control signal obtained by the program processing is applied to the contact of the other side of the switch portion 4 through the output interface 75. The central processing unit 72 makes a comparison of the signal obtained from the function generator 11 of the main control system 1 and the function obtained by the program processing, thereby to perform a simulation comparison check and a reasonable comparison check, to determine whether either the main control system 1 or the backup control system 2 is in an abnormal state. The central processing unit 72 further makes a simulation comparison check and a reasonable comparison check based on the pseudo data of the drive portion 5 stored in the random access memory 74 and the signal obtained from the drive portion 5. Furthermore, the central processing unit 72 also determines whether the microcomputer 7 itself is making a normal operation, by making parity check or the like. In the case where the main control system 1 is in an abnormal state, the contact of the switch portion 4 is turned to the side of the backup control systems 2, whereas in the case where the backup control system 2, i.e. the microcomputer 7 is in an abnormal state, the contact of the switch portion 4 is turned to the side of the main control system 1. If and when the main control system 1 is in an abnormal state, the tracking signal obtained from the main control system 1 abruptly changes as shown in FIG. 10B. The central processing unit 72 corrects the abruptly fluctuating tracking signal obtained from the main control system 1. More specifically, the central processing unit 72 makes a calculation based on the following equation for the purpose of correcting the tracking signal with a dead time component;

$$y(s) = e^{-LS} x(s)$$

where x is the applied tracking signal and L is the number of execution of the program. In actuality, evaluation of the following equation is performed:

$$y_n = x_{n-L}$$

Referring to the above described equation, $n-L$ is the dead time. Such calculation can be made with ease in accordance with the program processing.

Meanwhile, in the case where the tracking signal is corrected with the first order lag component, the following calculation is made:

$$y(s) = \frac{1}{1 + TS} x(s)$$

In order to make actually correction of the tracking signal with the first order lag component in accordance with program processing, calculation of the following equation is made:

$$y = \frac{2T - \Delta t}{2T + \Delta t} y + \frac{\Delta t}{2T + \Delta t} (x + xp)$$

$$x_p = x$$

where T is a time constant, $\Delta t$ is a unit time, and xp is the value of x at one preceding period, i.e. before $\Delta t$.

Through correction of the tracking signal with the dead time component or the first order lag component by the use of the central processing unit 72, the tracking signal, as corrected, is a signal with easy fluctuation, as shown in FIGS. 10C and 10D. Accordingly, the drive portion 5 is responsive to the control signal based on the tracking signal, as corrected, during a time period when the control portion 4 is switched from the main control system 1 to the backup control system 7. When the switch portion 4 is turned to the side of the backup control system 7, the microcomputer 7 is responsive to the input signals I1 to I4 to control the drive portion 5.

As described in the foregoing, the embodiment is structured such that the main control system 1 is implemented with an analog circuit while the backup control system 2 is implemented with a microcomputer 7 adapted to make operation in a software manner, including correction of the tracking signal such that the tracking signal is corrected with the dead time component or the first order lag component using the micro computer 7. Thus, even if either the main control system 1 or the backup control system 2 is an an abnormal state and the tracking signal abruptly fluctuates, the drive portion 5 can be controlled without causing disturbance.

Meanwhile, in the above described embodiment only the backup control system was implemented using a microcomputer; however, it is pointed out that the main control system 1 can also be implemented using a microcomputer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A backup control apparatus, comprising:

a main control system, a backup control system provided in parallel with said main control system, switch means responsive to one of said main control system and said backup control system being in an abnormal state for being turned to the other of said main control system and said backup control system, means responsive to said one of said main control system and said backup control system being in an abnormal state for providing a tracking signal to the other of said main control system and said backup control system during a time period when a switching operation is performed by said switch means, a machine to be controlled alternatively by said main and backup control systems in response to said tracking signal, a path for said tracking signal provided between said main control system and said backup control system, and correcting means provided in said tracking signal path for continually delaying said tracking signal applied to said other one of said main control system and said backup control system, whereby while said switching operation is performed by said switch means, said other one of said main control system and said backup control system are responsive to only said continually delayed tracking signal corresponding to said tracking signal prior to the abnormal state.

2. A backup control apparatus in accordance with claim 1, wherein said correcting means comprises a dead time component for delaying said tracking signal by a predetermined dead time for providing said tracking signal before the abnormality arises.

3. A backup control apparatus in accordance with claim 1, wherein said correcting means comprises a first order lag component for delaying said tracking signal by a predetermined delay time.

4. A backup control apparatus, comprising:

a main control system, a backup control system provided in parallel with said main control system, switch means responsive to one of said main control system and said backup control system being in an abnormal state for being turned to the other of said main control system and said backup control system, means responsive to said one of said main control system and said backup control system being in an abnormal state for providing a tracking signal to the other of said main control system and said backup control system during a time period when a switching operation is performed by said switch means, a machine to be controlled alternatively by said main and backup control systems in response to said tracking signal;

a path for said tracking signal provided between said main control system and said backup control system, and signal smoothing means provided in said tracking signal path for continuously smoothing fluctuations of said tracking signal provided to said other of said main control system and said backup control system during said switching operation to minimize the effect of the abnormal state on said other of said main control system and said backup control system following said switching operation.

* * * * *